United States Patent
Burtchen et al.

(10) Patent No.: US 10,053,748 B2
(45) Date of Patent: Aug. 21, 2018

(54) METHOD FOR INDUCTION SURFACE HARDENING OF A RING SURFACE

(71) Applicant: THYSSENKRUPP ROTHE ERDE GMBH, Dortmund (DE)

(72) Inventors: Marco Burtchen, Lippstadt (DE); Mathieu Langels, Erwitte (DE); Bernd Stakemeier, Erwitte (DE)

(73) Assignee: THYSSENKRUPP ROTHE ERDE GMBH, Dortmund (DE)

( * ) Notice: Subject to any disclaimer, the term of this patent is extended or adjusted under 35 U.S.C. 154(b) by 398 days.

(21) Appl. No.: 14/379,263

(22) PCT Filed: Feb. 6, 2013

(86) PCT No.: PCT/EP2013/052346
§ 371 (c)(1),
(2) Date: Aug. 15, 2014

(87) PCT Pub. No.: WO2013/120748
PCT Pub. Date: Aug. 22, 2013

(65) Prior Publication Data
US 2015/0368735 A1    Dec. 24, 2015

(30) Foreign Application Priority Data
Feb. 17, 2012    (DE) .................. 10 2012 101 309

(51) Int. Cl.
| | |
|---|---|
| C21D 9/40 | (2006.01) |
| C21D 1/10 | (2006.01) |
| C21D 1/42 | (2006.01) |
| C21D 1/667 | (2006.01) |

(52) U.S. Cl.
CPC .............. C21D 9/40 (2013.01); C21D 1/10 (2013.01); C21D 1/42 (2013.01); C21D 1/667 (2013.01); *Y02P 10/253* (2015.11)

(58) Field of Classification Search
CPC ............ C21D 9/40; C21D 1/667; C21D 1/42
USPC ....................................... 148/508
See application file for complete search history.

(56) References Cited

FOREIGN PATENT DOCUMENTS

| | | |
|---|---|---|
| CN | 100441706 C | 12/2008 |
| DE | 102005006701 B3 | 3/2006 |
| DE | 102006003014 B1 | 10/2007 |
| DE | 102008033735 A1 | 2/2010 |
| EP | 1988179 A2 | 11/2008 |
| JP | 60116724 A | 6/1985 |

OTHER PUBLICATIONS

German Language International Search Report for International Patent Application No. PCT/EP2013/052346; dated Apr. 19, 2013.
English Translation of International Search Report for International Patent Application No. PCT/EP2013/052346; dated Apr. 19, 2013.
English Abstract of Japanese Patent No. JP 60116724.
English Abstract of German Patent Application No. DE 102005006701 B3.
English Abstract of counterpart publication WO2007082957 to German Patent Application No. DE 102006003014B3.
English Abstract of counterpart publication WO2010006689 to German Patent Application No. DE 102008033735A1.
English Translation of International Preliminary Report on Patentability and Written Opinion of the International Searching Authority for PCT/EP2013/052346, dated Aug. 28, 2014.
First Chinese Office Action for Counterpart Chinese patent application No. CN 201380009695.3.
English language translation of the abstract of CN 100441706 C.

*Primary Examiner* — Edward Johnson
(74) *Attorney, Agent, or Firm* — thyssenkrupp North America, Inc.

(57) ABSTRACT

The invention relates to a method for the induction surface hardening of a ring surface of a workpiece, the ring surface and a hardening device having an induction coil being moved relative to one another in a treatment direction in a feed mode. A sprinkler is located downstream of the induction coil when seen in the direction of treatment and serves to heat the ring surface, starting from an initial zone to a final zone, by means of the induction coil and then to harden it by cooling the ring surface by means of the sprinkler, an unhardened soft zone being provided between the initial zone and the end zone. According to the invention, the supplementary induction coil, the induction coil and the sprinkler are activated and deactivated separately from one another at the start of the hardening process and at the end of the hardening process, respectively, the speed between the hardening device and the workpiece and/or the power supplied to the supplementary induction coil and the induction coil being varied at the same time.

6 Claims, 4 Drawing Sheets

Fig. 4
a)
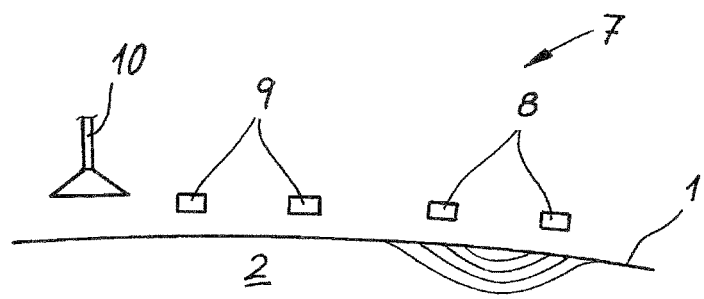
b)
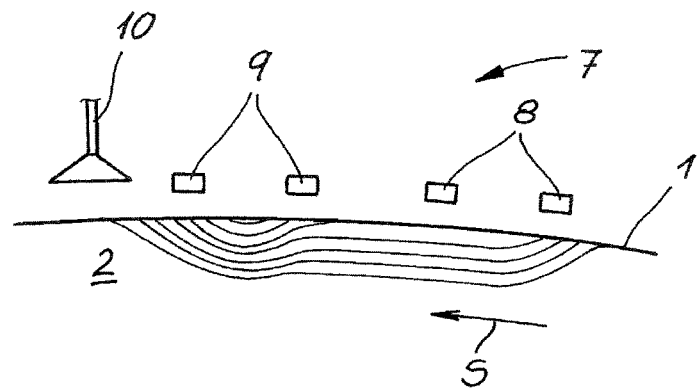
c)
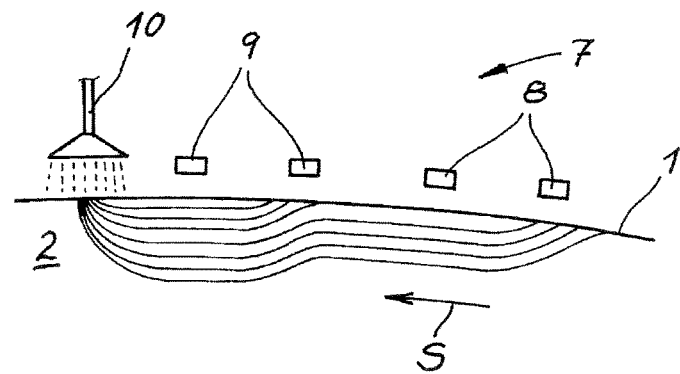

METHOD FOR INDUCTION SURFACE HARDENING OF A RING SURFACE

CROSS REFERENCE TO RELATED APPLICATIONS

This application is a U.S. National Stage Entry of International Patent Application Serial Number PCT/EP2013/052346, filed Feb. 6, 2013, which claims priority to German National Patent Application Serial Number DE102012101309.8, filed Feb. 17, 2012.

FIELD

The present invention relates to a method for induction surface hardening of a ring surface of a workpiece, particularly a running surface of a bearing ring, the ring surface and a hardening device with an inductor being moved relative to one another in a direction of treatment in a feeding mode, a spray being located downstream of the inductor, as seen in the direction of treatment, in order to heat the ring surface from an initial zone to an end zone by means of the inductor and then harden it by cooling by means of the spray, an unhardened slip zone being provided between the initial zone and the end zone.

BACKGROUND

In the hardening of a closed curve trace in the form of a ring surface by local heating and subsequent quenching, there is the problem that already hardened regions must not be heated again to a temperature at which the hardness properties are lost again. In the case of a ring surface, an unhardened slip zone, which has for example a width of between 10 mm and 20 mm, is therefore provided between an initial zone, at which the hardening is begun, and an end zone, which is hardened last. In the case of rolling bearings, it is known to relief-grind this slip zone, in order that the rolling bodies do not have bearing contact there. It must also be taken into account that the initial zone and the end zone represent a transitional region with respect to the effective depth of hardening and the hardness at the surface, because both parameters respectively decrease in the direction of the slip zone. In the hardened region between the initial zone and the end zone, on the other hand, uniform hardness properties are achieved as a result of a uniform movement between the hardening device and the workpiece and also as a result of constant parameters. Apart from the speed between the hardening device and the ring surface, the hardening result can be set by the power output and the frequency of the inductor, the amount and temperature of the coolant delivered by the spray and also by controlling any preheating that may be provided.

In the case of the methods for induction surface hardening with an inductor that are known from practice, the hardening device is activated in the initial zone with the parameters intended for continuous hardening and is deactivated again in the end zone.

The documents DE 10 2005 006 701 B3, DE 10 2006 003 014 B1 and DE 10 2008 033 735 A1 disclose methods for induction surface hardening of a ring surface of a workpiece. In the case of this method, a slip zone is avoided or reduced by using two inductors, which are moved counter to one another, starting from an initial zone. The initial zone can in this case be hardened completely, because uniform heating, or at least largely uniform heating, can be achieved by the two inductors. The two inductors are then moved counter to one another and finally come together at the end zone, which on the ring surface lies opposite the initial zone. The end zone is also heated only once, when the two inductors approach one another from both sides. Since the two inductors cannot be brought up unrestrictedly close to one another, the end zone may be initially preheated with a supplementary inductor. A disadvantage of the methods described is that, particularly in the case of large rolling bearings, very considerable expenditure is necessary with regard to the hardening device with counter-running inductors.

SUMMARY

The present invention is based on the object of providing a method with the features described at the beginning in which the weakening of the ring surface as a result of the reduced hardness in the initial zone and the end zone is less pronounced.

BRIEF DESCRIPTION OF THE DRAWINGS

The present disclosure is described in detail below with reference to the attached drawing figures, wherein:

FIGS. 4a-4c are side partial schematic representations showing embodiments of temperature distribution patterns through a workpiece being subjected to a surface hardening process as disclosed herein, taken at different points in time at the beginning of the hardening process.

DETAILED DESCRIPTION

Figure 1:
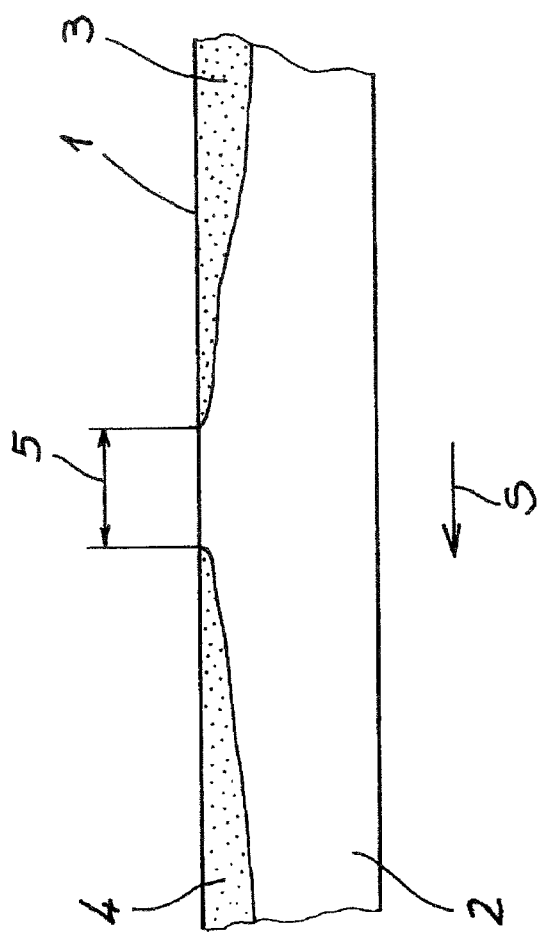
FIG. 1 is a side partial cross-section view of a region of an annular running surface of a workpiece at which an induction surface hardening operation begins and ends, and further depicting surface hardening penetration depths at an initial treatment zone and an end treatment zone, with an unhardened slip zone remaining between the initial zone and the end zone, after undergoing a surface hardening treatment method as disclosed herein.

On the basis of a method according to the preamble of patent claim 1, the object is achieved according to the invention by providing that, in succession, a supplementary inductor, which is intended as a preheater and is arranged upstream of the inductor in the direction of treatment as a component part of the hardening device, is subjected to an alternating current while the inductor and the spray are inactive; with the supplementary inductor active and the inductor inactive and also the spray inactive, the hardening device is moved in relation to the workpiece at a first speed; with the supplementary inductor still active but the spray inactive, the inductor is activated by being subjected to an alternating current and a second speed is set; with the inductor active and the supplementary inductor active, the spray is activated and a third speed is set; with the inductor active and the spray active, the supplementary inductor is deactivated and a fourth speed is set and, finally, the inductor is deactivated.

The present invention is based on the realization that, in the case of induction surface hardening with an inductor, an unhardened slip zone cannot be avoided, but an increase in the hardness and the effective depth of hardening that is as quick as possible can be achieved by variably controlling the hardness parameters, such as the speed, the power output and the amount of spray, starting from the slip zone. The initial zone and the end zone, in which the hardness properties respectively change, starting from the unhardened slip zone, until substantially constant parameters are obtained, can in this way be kept as short as possible. The hardness parameters are changed in the initial zone, that is say at the beginning of hardening, in a number of steps, in order to achieve an increase in the hardness that is as great as possible. It must be taken into account here that, before the beginning of hardening, the ring surface to be hardened is initially at ambient temperature, for which reason the heat input by the supplementary inductor as a preheater and also by the main inductor must be increased or the speed must be reduced. A temperature gradient that is as steep as possible is expediently set, in order also to achieve an increase in the hardness or the effective depth of hardening at the ring surface that is a steep as possible over a path that is as short as possible, starting from the slip zone. The hardness parameters are also changed in a number of steps toward the end of the hardening operation, in order to keep the resultant heat input of the inductors initially as constant as possible and also to achieve a temperature gradient that is as steep as possible with respect to the slip zone.

According to the invention, the hardness parameters are changed over time in order to achieve an optimum result of the hardening operation at the beginning of the hardening and at the end of the hardening. For this purpose, particularly the power outputs supplied, the feeding speed and/or the amount of spray for the cooling are varied. Variation takes place in a number of steps, it being intended in this way for continuous changing of the hardness parameters over a time interval or over the entire hardening operation also to be included within the scope of the invention. The previously defined speeds that are respectively set at the beginning of a new phase then form as it were interpolation points of a progression that is changing continuously over time.

Within the scope of the invention, a relative movement between the hardening device and the ring surface is produced, the speeds relating to the relative speed between the hardening device and the ring surface. It is thus possible for example to move the ring surface of the workpiece past the fixed hardening device or else to move the hardening device along the surface to be hardened with a workpiece at rest. The first variant has proven to be successful particularly in the case of running surfaces of a large rolling bearing, it being possible for the bearing ring to be arranged horizontally, vertically or at an angle and the movement of the bearing ring taking place by way of supporting rollers. The direction of feeding of the bearing ring is then counter to the direction of treatment in which the hardening operation proceeds during the treatment.

According to the invention, firstly the preheater is activated, in order initially to preheat the ring surface in the initial zone. Since the ring surface is initially cold with respect to the temperature intended for the hardening, the hardening device and the ring surface may initially remain at rest after the activation of the supplementary inductor, and so the speed is equal to zero. Alternatively, there is also the possibility of firstly setting a negative speed directly after the activation of the supplementary inductor. A relative movement between the ring surface and the hardening device that is counter to the movement during the continuous hardening operation then takes place. Thus, the supplementary inductor and also the inductor may be formed by a conductor loop with two parallel conductors. In order then to produce a temperature gradient that is as steep as possible, a rearward movement may take place between the ring surface and the hardening device, the path of this rearward movement corresponding to half the distance between the two parallel conductors.

After a first preheating of the ring surface in the initial zone, the ring surface is turned further, until the entire portion preheated at the beginning lies under the inductor. The regions of the ring surface adjoining this first portion are in this case likewise preheated by the further movement at the first speed. Then, the inductor is activated by being subjected to alternating current, in order to bring the previously preheated region of the ring surface to the temperature intended for the hardening. The path covered after the activation of the supplementary inductor and before the activation of the inductor expediently corresponds to the distance between these two devices. The second speed, set when activating the inductor, may in principle be equal to the first speed. Preferably, however, a higher speed is set, in order to make allowance for the heating that has already taken place and the altogether increased power output supplied.

In order finally to quench the ring surface heated up by the inductor, and thereby harden it, the spray arranged downstream of the inductor in the direction of movement is activated with a delay. In principle, it is also within the scope of the invention to vary the amount of spray, that is to say the amount of cooling fluid supplied to the spray, according to requirements between the beginning of the hardening and the final hardening.

With the activation of the spray, a third speed is set, which however is preferably equal to the second speed.

After the activation of the spray, substantially constant conditions are established for the hardening and are used for hardening the greatest part of the ring surface, for example at least 80% of the ring surface. In the course of setting virtually constant values, a further, optimum speed may also be chosen for the hardening under constant conditions, such a fifth speed preferably being greater than the third speed.

In addition or as an alternative to the changing of the speeds, the power output of the inductor or of the supplementary inductor may also be changed, the power output preferably being increased in an interval following the respective activation thereof as compared with an interval following thereafter. Such a timed increase in the power output at the beginning makes allowance for the fact that constant conditions have not yet been obtained with respect to the temperature distribution.

A variation of the hardness parameters in a number of steps is also intended in the region of the end zone. Thus, firstly the supplementary inductor arranged upstream in the direction of treatment is deactivated, in order to avoid undesired heating in the region of the slip zone. As previously explained, a temperature gradient that is as steep as possible is also produced in the end zone, in order to make a correspondingly steep transition between the hardened regions and the unhardened regions possible. When the deactivation of the supplementary inductor occurs, a fourth speed is set, which is preferably reduced as compared with the previously described fifth speed and may for example correspond to the third speed. This reduction of the speed with respect to the substantially continuous hardening operation makes allowance for the fact that the slip zone that has cooled down again represents a heat sink, requiring that the then absent heat input by the supplementary inductor is also compensated to a certain extent. In order to increase the heating by the inductor itself, in addition or alternatively the power output of the inductor may also be increased. As already explained above, both measures, that is to say adaptation of the power output supplied and changing of the speed, may also be combined in a suitable way over the entire hardening operation.

Finally, the inductor is also deactivated, here too the path covered between the deactivation of the supplementary inductor and the inductor corresponding approximately to the distance between the supplementary inductor and the inductor. The spray initially remains active, in order to be able to quench the region of the end zone last heated up by the inductor. After the deactivation of the spray, the workpiece with the hardened ring surface can be removed from the hardening device.

Within the scope of the present invention, the distinction between the inductor and the supplementary inductor relates to the different function of these two devices, that is to say the preheating and the heating up to the hardening temperature. The inductor and the supplementary inductor may be similar or even identical in their configuration. Suitable, for example, is a conductor loop with two conductors parallel to one another that are connected by way of a leg.

Such a conductor loop is connected to an alternating current generator, which is operated for example at a frequency of between 3 kHz and 8 kHz. On account of the currents necessary for the heating, the conductor loop may also be hollow and flowed through by a cooling medium.

In order to make precise control possible, particularly in the case of large workpieces, for example a bearing ring of a large rolling bearing, a reference point for controlling the hardening device may be determined by a marking on the ring surface and a sensor assigned to the hardening device. In this way, any dimensional deviations of the workpieces, inaccuracies in the driving of the workpiece or the hardening device and also different thermal expansions cannot have an adverse influence on the hardening process.

FIG. 1 shows by way of example the region of a ring surface 1 of a workpiece 2, for example a running surface of a bearing ring, a slip zone 5 that is unhardened remaining between an initial zone 3, in which the induction surface hardening was begun, and an end zone 4, in which the induction surface hardening was ended. It is indicated that in the initial zone 3 and the end zone 4 the effective depth of hardening and the hardness respectively decrease in the direction of the slip zone 5.

With respect to the ring surface 1, the slip zone 5 represents a weakening and may for example be reliefground, in order that rolling bodies do not have local bearing contact there. In addition, however, it is also evident that the surface hardness and the effective depth of hardening are also reduced in the region of the initial zone 3 and the end zone 4 and respectively increase continuously from the unhardened slip zone 5. Altogether, improved properties of the ring surface are achieved if not only the slip zone 5 is as short as possible, but also the effective depth of hardening and the surface hardness increase as quickly as possible within the initial zone 3 and the end zone 4, from the slip zone 5, to a value that is otherwise virtually constant around the circumference.

In order to achieve this, the present invention provides a specific setting of the hardness parameters in a number of steps at the beginning and the end of the hardening.

Figure 2:
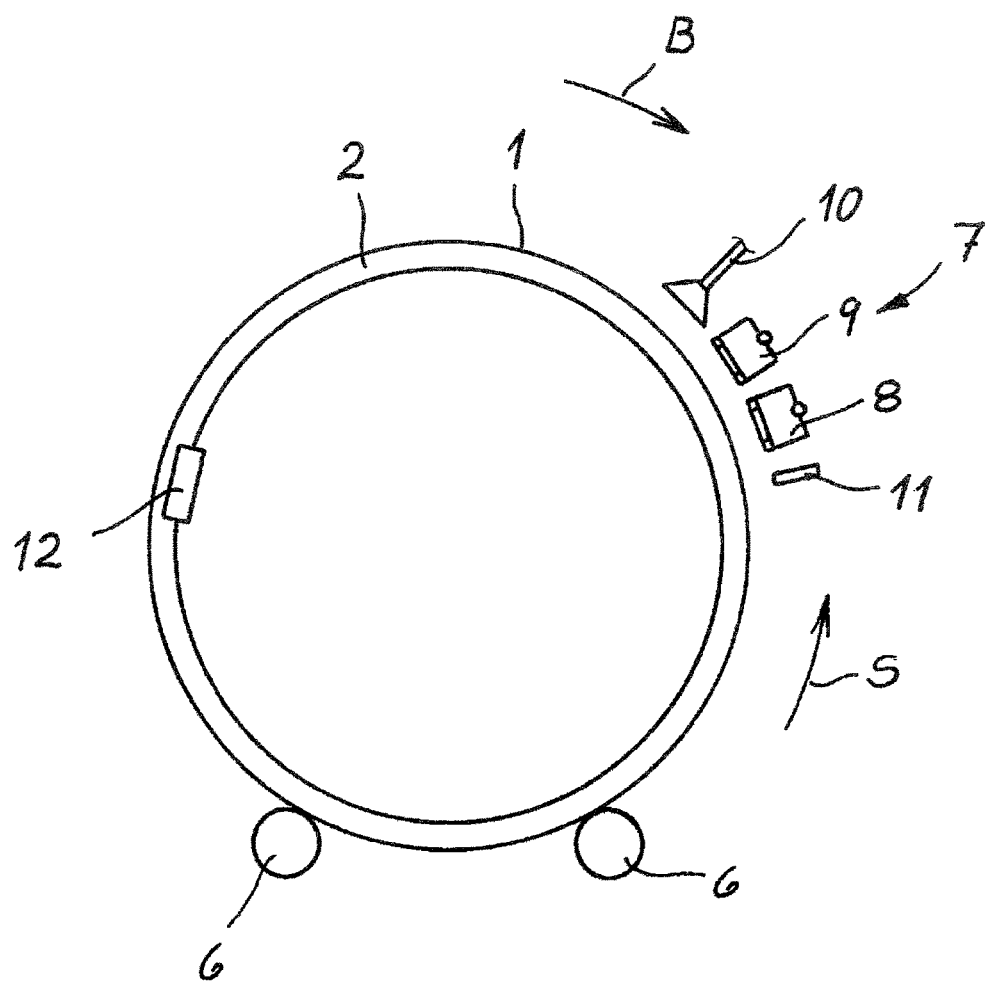
FIG. 2 is a side view of an embodiment of an apparatus for induction surface hardening of a work piece, as disclosed herein.

FIG. 2 shows an apparatus for induction surface hardening, the workpiece 2 being vertically aligned and supported on rollers 6. By means of the driven rollers 6, the outer lying ring surface 1 of the workpiece 2 can be moved with respect to a fixed hardening device 7, the direction of treatment B in which the hardening proceeds being counter to the direction of feeding S of the workpiece 2.

The hardening device 7 comprises one behind the other, as seen in the direction of feeding S, a supplementary inductor 8 as a preheater, an inductor 9 and a spray 10. In the exemplary embodiment represented, the hardening device 7 also comprises an optional sensor 11, in order to detect a marking 12 applied to the workpiece 2 and thus control the hardening operation.

Figure 3:
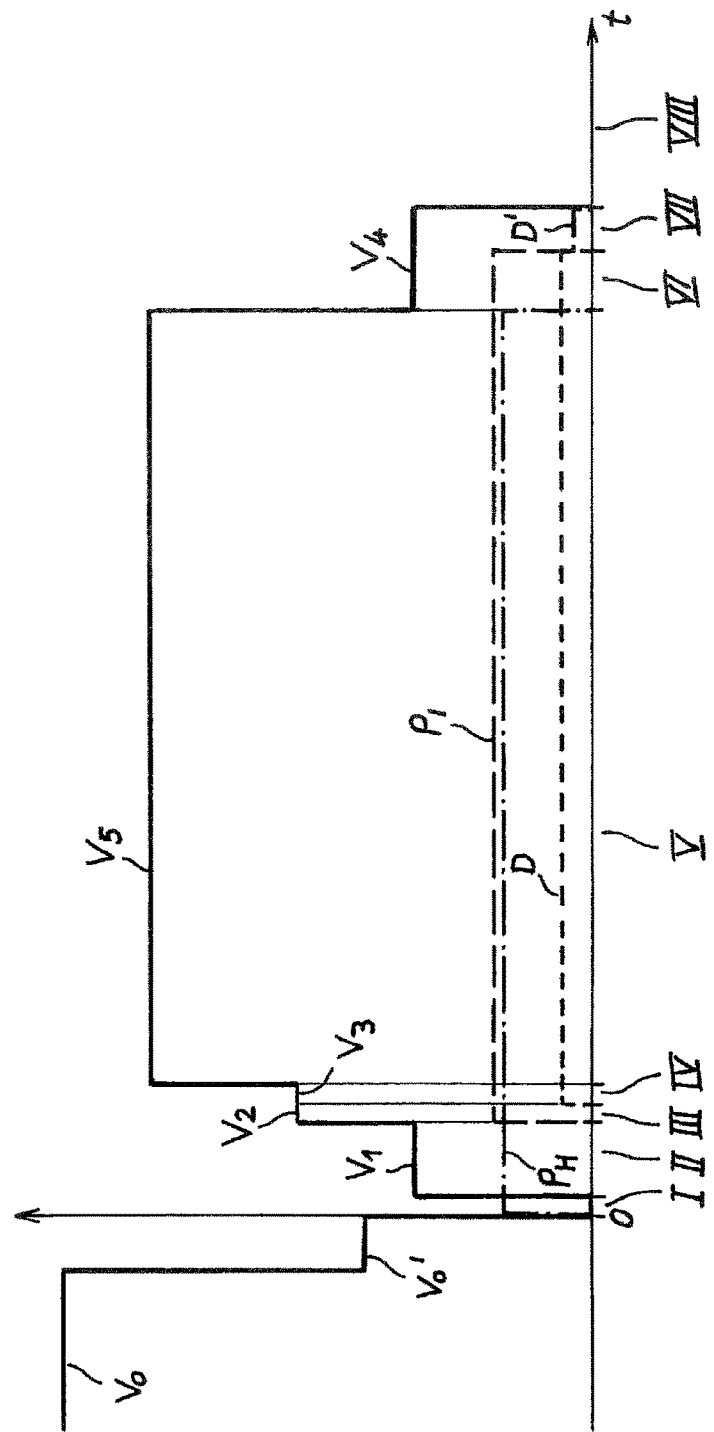
FIG. 3 is an embodiment of an exemplary change over time of various hardness process parameters, according to an embodiment of the methods disclosed herein.

FIG. 3 shows by way of example the change over time of various hardness parameters during the hardening operation. The speed v between the hardening device 7 and the ring surface 1, the power output $P_H$ supplied to the supplementary inductor 8 in the form of alternating current, the power output $P_I$ supplied to the inductor in the form of alternating current and the throughflow D of the coolant supplied to the spray 10 are represented.

Firstly, the workpiece 2 is turned at a high speed $v_0$, until the marking 12 is sensed by the sensor 11. The workpiece 2 is then turned still further at a reduced speed $v_0'$, until at the beginning of a first phase I the supplementary inductor 8 intended as a preheater is activated and subjected to the power output $P_H$. In this first phase I, the workpiece 2 remains at rest.

In the subsequent second phase II, it is still just the supplementary inductor 8 that is active, the ring surface 1 being moved in the second phase II at a first speed $v_1$ in a way corresponding to the distance between the supplementary inductor 8 and the inductor 9.

At the beginning of a third phase III, the inductor 9 is then activated and subjected to a power output $P_I$, an increased, second feeding speed $v_2$ being set at the same time.

In a further phase IV, the previously inactive spray 10 is then subjected to a predetermined throughflow D of coolant. It is only by the cooling of the ring surface 1 previously heated up by the supplementary inductor 8 and the inductor 9 that a transformation of the material, and consequently a surface hardening, takes place. With the activation of the spray, a third speed $v_3$ is set, which however is equal to the second speed v2. After the step-by-step activation of the supplementary inductor 8, the inductor 9 and the spray 10, approximately constant conditions are established, but an increased, fifth feeding speed $v_5$ being set in a further, fifth phase. During this fifth phase V, the greatest part of the ring surface 1 is hardened under virtually constant conditions.

A number of steps are also provided in the ending of the hardening operation. Thus, firstly, at the beginning of a sixth phase VI, the supplementary inductor 8 is deactivated. At the same time, a fourth speed $v_4$ is set, which in the exemplary embodiment corresponds to the first speed $v_1$. The reduction of the speed makes allowance for the fact that heating of the ring surface 1 can then only take place by the inductor 9, and no longer by the supplementary inductor 8, for which reason the lower energy input is equalized by a correspondingly reduced feed.

Finally, at the beginning of a seventh phase VII, the inductor 9 is also deactivated. The spray 10 in this case initially remains active with a reduced throughflow D', in order to cool down the last-heated region of the ring surface 1 in the end zone 4. At the beginning of an eighth phase VIII, finally, the spray 10 is also completely deactivated, and so the hardening operation is completely ended.

FIGS. 4a to 4c show by way of example the temperature distribution at the hardening device during the first phase I, at the beginning of the third phase II and also during the fifth phase V. The temperature progression is in this case indicated by equipotential lines (lines of equal temperature).

According to FIG. 4a, the supplementary inductor 8, as a preheater, brings about local heating, the workpiece 2 still remaining at rest during the first phase I. During the second phase II, the workpiece 2 is then moved in the direction of feeding S, whereby the region previously preheated under the supplementary inductor 8 lies under the inductor 9. Only then is the inductor 9 activated at the beginning of the third phase III, in order to achieve a temperature sufficient for the surface hardening (FIG. 4b).

FIG. 4c finally shows the progressive hardening in the fifth phase V under virtually constant conditions, the ring surface 1 that is taken past the hardening device 7 being continuously preheated by the supplementary inductor 8, brought to the necessary temperature for the surface hardening by the inductor 9 and finally quenched by the spray 10.

The invention claimed is:

1. A method for induction surface hardening a ring surface of a workpiece by a hardening device having (1) a primary heating inductor configured to heat the ring surface of the work piece from an initial zone to an end zone, (2) a preheater inductor disposed upstream of the primary heating inductor in a direction of treatment and configured to preheat the ring surface of the workpiece before the ring surface encounters the primary heating inductor, (3) a sprayer disposed downstream of the primary heating inductor in a direction of treatment and configured to quench the heated work piece so as to harden the surface of the workpiece from the initial zone to the end zone with an unhardened slip zone disposed between the initial zone and the end zone, the hardening device and the ring surface of the work piece being movable relative to one another in a direction of treatment when in a feeding mode, comprising:

activating the preheater inductor, so as to preheat the ring surface of the work piece;

setting a first speed v1 at which the hardening device and the work piece move relative to each other in a direction of treatment, so as to preheat locations on the ring surface moving past the preheater inductor;

activating the primary heating inductor so as to increase the temperature of locations of the ring surface of the workpiece moving past the primary heating inductor, and simultaneously setting a second speed v2 at which the hardening device and the work piece move relative to each other in a direction of treatment, wherein the second speed v2 is greater than the first speed v1;

activating the sprayer so as to apply quenching liquid to locations of the ring surface moving past the sprayer and quench the locations on the ring surface that have been heated by the primary heating inductor, and simultaneously setting a third speed v3 at which the hardening device and the work piece move relative to each other in a direction of treatment;

deactivating the preheater inductor, and simultaneously setting a fourth speed v4 at which the hardening device and the work piece move relative to each other in a direction of treatment; and deactivating the primary heater inductor.

2. The method of claim 1, further comprising maintaining an initial at-rest position of the work piece relative to the hardening device directly after activating the preheater inductor.

3. The method of claim 1, further comprising setting a negative speed of relative motion between the work piece and the hardening device, by which the hardening device and work piece move relative to each other in a direction opposite the direction of treatment.

4. The method of claim 1, wherein the second speed v2 is equal to the third speed v3.

5. The method of claim 1, further comprising setting a fifth speed v5 at which the hardening device and the work piece move relative to each other in a direction of treatment, after said activating of the sprayer and before said deactivating the preheater inductor, wherein the fifth speed v5 is greater than the third speed v3 and the fourth speed v4.

6. The method of claim 1, further comprising:

marking a reference point on the ring surface of the work piece, the location of which is to be used as an input to control one or more operational parameters of the hardening device;

sensing the marked reference point by a sensor of the hardening device; and controlling one or more operational parameters of the hardening device by the sensor upon said sensing the marked reference point.

* * * * *